Figure 1:
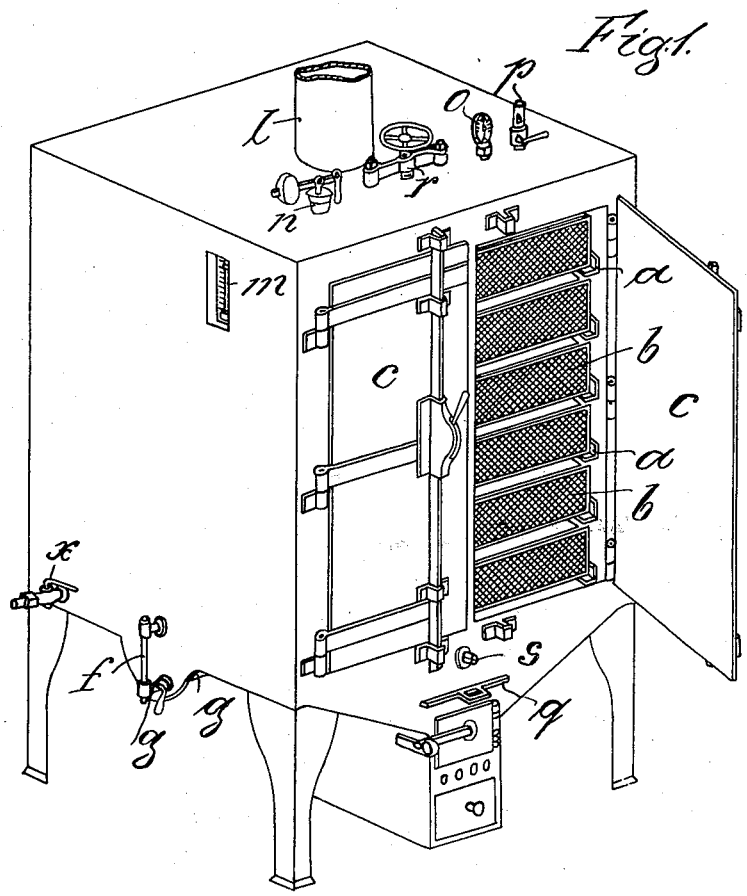

No. 862,443. PATENTED AUG. 6, 1907.
J. P. BRÜCK.
STEAMING OVEN OR COOKING APPARATUS.
APPLICATION FILED SEPT. 13, 1905.

2 SHEETS—SHEET 1.

Witnesses:
Inventor:
his Attorney

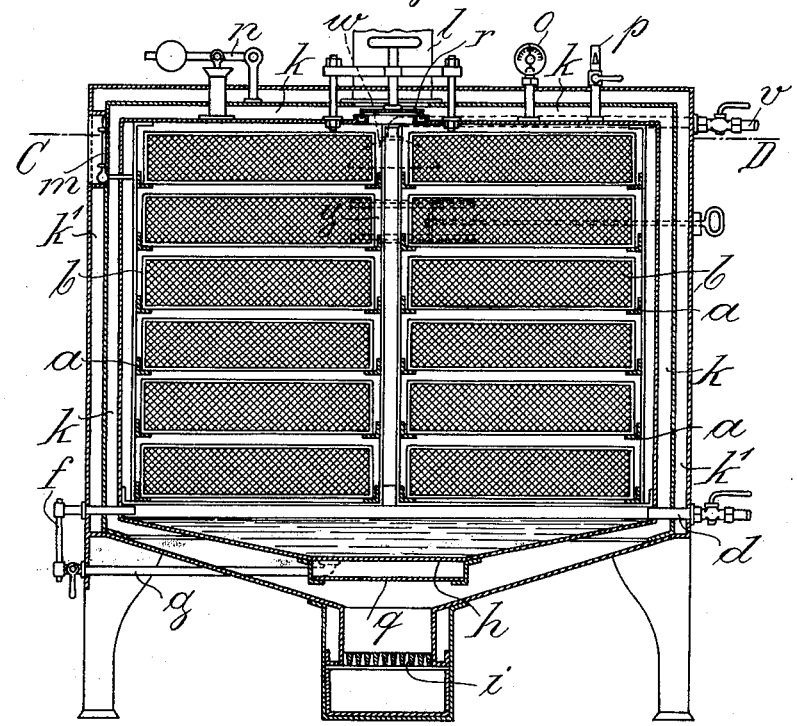
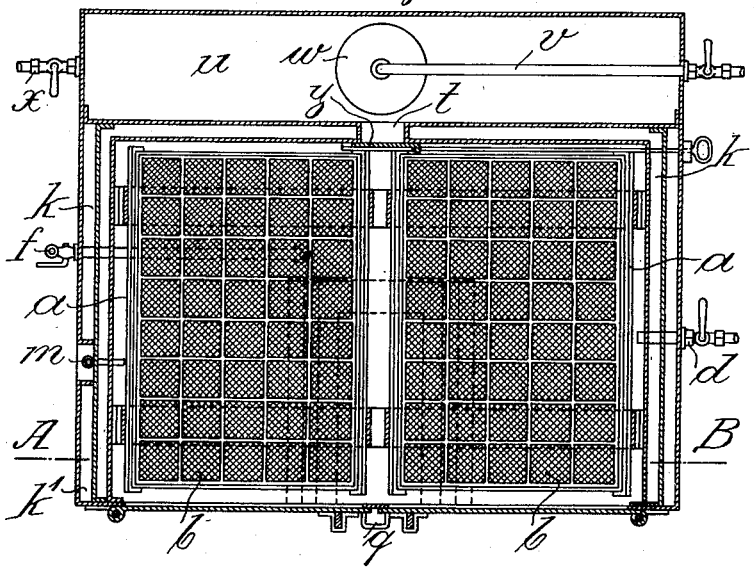

UNITED STATES PATENT OFFICE.

JEAN PIERRE BRUCK, OF LUXEMBURG, NETHERLANDS.

STEAMING-OVEN OR COOKING APPARATUS.

No. 862,443.      Specification of Letters Patent.      Patented Aug. 6, 1907.

Application filed September 13, 1905. Serial No. 278,355.

*To all whom it may concern:*

Be it known that I, JEAN PIERRE BRUCK, administrator of penitentiary, a subject of the Grand Duchy of Luxemburg, residing in Grund, Munster street, Luxemburg, Netherlands, have invented certain new and useful Improvements in Steaming-Ovens or Cooking Apparatus, of which the following is a specification.

The present invention relates to an improved steaming oven or cooking apparatus particularly adapted for use in prisons, barracks and like places where large quantities of food are to be prepared at one time.

In order to obtain a rapid, uniform and thorough steaming of the material, it is essential that such material be spread out in comparatively thin layers so that the steam may surround the mass of material uniformly and thus act on all parts effectively and quickly.

To this end the invention comprises a suitably shaped oven or steam tight casing provided with a door or doors in one of the vertical walls through which the apparatus may be filled. The inside of the oven is preferably provided with a series of brackets upon which a series of drawers, boxes or the like having perforated walls may be placed and drawn out independently of each other. By this means, it is possible to introduce into the apparatus substances which require steaming for different lengths of time.

In order to minimize the necessity for handling the steaming material the drawers or boxes may be filled with smaller boxes, also having perforated walls, the size of such boxes being so arranged that each box contains a defined portion, and if desired these boxes may be employed for serving the food to the persons for whom it is intended.

As it is necessary to dry certain materials, such as potatoes, after the steaming is finished, a damper or plate is provided which may be slid between the bottom of the water chamber and the grate, the object of the same being to protect the bottom of such water chamber from burning after the water has been run off to allow the material to dry. In order to permit of the steam remaining in the oven being drawn off prior to drying, a steam outlet is provided at the top of the oven and an air inlet near the base thereof. If desired the exhaust steam may be utilized for warming water by discharging it into a separate chamber communicating with the oven, means being provided for opening and closing such communication. A water spray is arranged in such chamber, the water therefrom being warmed by the steam and suitable means are provided for drawing off the water.

Figure 4:
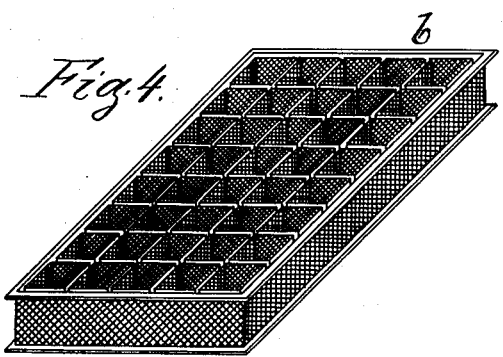

The invention will now be more particularly described with reference to the accompanying drawings in which:

Figure 1 is a perspective view of one form of the apparatus, with the door half open. Fig. 2 is a section along the line A—B of Fig. 3. Fig. 3 is a section along the line C—D of Fig. 2, and Fig. 4 represents one of the drawers or boxes for holding the material to be steamed.

The apparatus which, as can be seen from Fig. 1, is in the form of an oven, is provided with internal brackets $a$ upon which boxes $b$ adapted to hold the material to be steamed are slidably supported. These boxes $b$ can be drawn out of the apparatus separately when the door $c$ has been opened. Water is admitted into the bottom part of the apparatus by means of a pipe $d$ (Fig. 2), and can be drawn off through a pipe $g$, the level of the water in the apparatus being shown by the gage glass $f$. Below, the bottom $h$ of the water chamber is a grate $i$, the heat and gases from which first strike the bottom $h$, then flow into a jacket $k$ entirely surrounding the apparatus and escape into a chimney $l$ in the upper part of the oven. Thence it will be seen that the entire space surrounding the oven is bathed by the fire gases, while the steam liberated from the water in the bottom chamber acts directly on the material in the perforated drawers and boxes and steams the same. The walls of the apparatus are preferably double or multiple, so that in addition to the fire jacket $k$, there is a space $k'$ which may be filled with non-conducting material to prevent loss of heat by radiation. In addition to the parts mentioned, the apparatus may be provided with fittings, such as a thermometer $m$, safety valve $n$ pressure gage $o$ and signal whistle $p$, which blows when the steam pressure in the apparatus gets too high.

Below the bottom $h$ of the water chamber is placed a damper or plate $q$ which, after the steaming is finished and the water has been run off through the pipe $g$ is pushed in, in order that the drying of the material may be effected by dry heat, the damper $q$ then protecting the bottom $h$ from burning.

In order to draw off the steam during the dry heating process, a closable upper opening $r$, connecting the steaming chamber with the chimney $l$, is provided, as also a closable air-inlet $s$ (see Fig. 1) below. As above mentioned the exhaust steam may be utilized for warming water, for which purpose a chamber $u$ is provided shown in the present case behind the steaming chamber, with which it communicates through a closable opening $t$. This chamber $u$ contains a water jet $w$ supplied by a pipe $v$ and is provided with a pipe $x$ for drawing off the heated water. When communication is established between the steaming chamber and the chamber $u$ by drawing the damper $y$, which closes the opening $t$ and when at the same time the air inlet $s$ in the steaming chamber is opened and the water passing through the jet $w$ is turned on, such water issuing from the jet draws the steam, so that the latter passes into the chamber $u$ and warms the water therein.

Having now particularly described and ascertained the nature of my said invention and in what manner the same is to be performed, I declare that what I claim is:

1. In an apparatus of the class described, an oven having a fire grate and a water chamber, a damper or plate arranged between the fire grate and water chamber, the oven being provided with a steam outlet at the top and with an air inlet at the bottom thereof.

2. In an apparatus of the class described having drawers or boxes divided into compartments by a series of perforated boxes, the combination of a casing provided with a chamber around the walls forming a flue, a chamber around the flue chamber filled with non-conducting material, a fire grate arranged beneath the casing, a water chamber arranged beneath the oven, a flue member conducting heat from the fire grate to the bottom of the water chamber and communicating with the flue chamber of the oven, a damper arranged between the fire grate and the water chamber, the oven having a steam outlet at the top and air inlet at the bottom thereof, and a chamber communicating with the oven into which the exhaust steam is allowed to pass to heat water passing into such chamber in the form of a jet.

3. In an apparatus of the class described comprising a closed receptacle having one or more doors, drawers arranged to slide in the receptacle and provided with compartments, a water vessel at the lower part of the receptacle open to the drawers, said vessel having an inlet and also having an outlet at its lower part, a chamber arranged below said vessel, a furnace opening into said chamber at its middle portion, walls providing a chamber at the sides back and top of the receptacle and communicating with the chamber below the water vessel, the top wall of the apparatus having an outlet for smoke, said water vessel having an air inlet below the drawers, means for closing said inlet, a valve inlet at the top of the vessel having a drawer, and a reduced chamber at the bottom of the water vessel above the furnace, said chamber having a movable bottom.

JEAN PIERRE BRUCK.

Witnesses:
 CHARLES DUMONT,
 DÉSIRÉ DENUTH.